United States Patent
Yang et al.

(10) Patent No.: US 10,236,490 B2
(45) Date of Patent: Mar. 19, 2019

(54) SEPARATOR FOR RECHARGEABLE LITHIUM BATTERY AND RECHARGEABLE LITHIUM BATTERY INCLUDING THE SAME

(71) Applicants: SAMSUNG SDI CO., LTD., Yongin-si, Gyeonggi-do (KR); SAMSUNG ELECTRONICS CO., LTD., Suwon-si, Gyeonggi-do (KR)

(72) Inventors: Seungrim Yang, Seongnam-si (KR); Byungmin Lee, Suwon-si (KR); Bokyung Jung, Yongin-si (KR); Myungkook Park, Suwon-si (KR); Eon-Mi Lee, Yongin-si (KR); Sungsoo Han, Hwaseong-si (KR); Hana Kim, Suwon-si (KR); Jungsue Jang, Suwon-si (KR); Minho Cho, Suwon-si (KR); Hyoungwoo Choi, Hwaseong-si (KR)

(73) Assignees: SAMSUNG SDI CO., LTD., Yongin-si, Gyeonggi-do (KR); SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 239 days.

(21) Appl. No.: 15/073,684

(22) Filed: Mar. 18, 2016

(65) Prior Publication Data
US 2016/0285063 A1  Sep. 29, 2016

(30) Foreign Application Priority Data
Mar. 27, 2015  (KR) .................. 10-2015-0043601

(51) Int. Cl.
*H01M 2/16*   (2006.01)
*H01M 10/052* (2010.01)

(52) U.S. Cl.
CPC ......... *H01M 2/1686* (2013.01); *H01M 2/166* (2013.01); *H01M 2/1646* (2013.01); *H01M 2/1653* (2013.01); *H01M 10/052* (2013.01)

(58) Field of Classification Search
CPC ............. H01M 2/1686; H01M 2/1653; H01M 2/1646; H01M 2/166; H01M 10/052
See application file for complete search history.

(56) References Cited

U.S. PATENT DOCUMENTS

| | | | | |
|---|---|---|---|---|
| 2010/0316903 A1* | 12/2010 | Kim | .................... | H01M 2/1653 429/145 |
| 2011/0143183 A1* | 6/2011 | Matsumoto | ......... | H01M 2/1626 429/144 |
| 2013/0224559 A1* | 8/2013 | Furutani | ............... | H01M 2/145 429/145 |

FOREIGN PATENT DOCUMENTS

| | | |
|---|---|---|
| JP | 2000-067866 A | 3/2000 |
| JP | 2001-023600 A | 1/2001 |

(Continued)

*Primary Examiner* — Osei K Amponsah
(74) *Attorney, Agent, or Firm* — Lee & Morse, P.C.

(57) ABSTRACT

A separator for a rechargeable lithium battery and a rechargeable lithium battery including the same, the separator including a substrate, and a heat-resistant porous layer on at least one side of the substrate, the heat-resistant porous layer including a crosslinked binder and a non-crosslinked binder, wherein the crosslinked binder has a cross-linked structure of at least one crosslinkable compound, the at least one crosslinkable compound including a multi-functional urethane-based compound, and the crosslinked binder and the non-crosslinked binder are included in a weight ratio of about 3:7 to about 8:2.

20 Claims, 1 Drawing Sheet

(56) References Cited

FOREIGN PATENT DOCUMENTS

| | | |
|---|---|---|
| JP | 2005-209570 A | 8/2005 |
| JP | 2012-033498 A | 2/2012 |
| KR | 1999-0083447 A | 11/1999 |
| KR | 2001-0100979 A | 11/2001 |
| KR | 10-2008-0097364 A | 11/2008 |
| KR | 10-2009-0056811 A | 6/2009 |
| KR | 10-1002161 B1 | 12/2010 |
| KR | 10-2013-0118207 A | 10/2013 |
| KR | 10-2014-0055901 A | 5/2014 |
| KR | 10-1393534 B1 | 5/2014 |

* cited by examiner

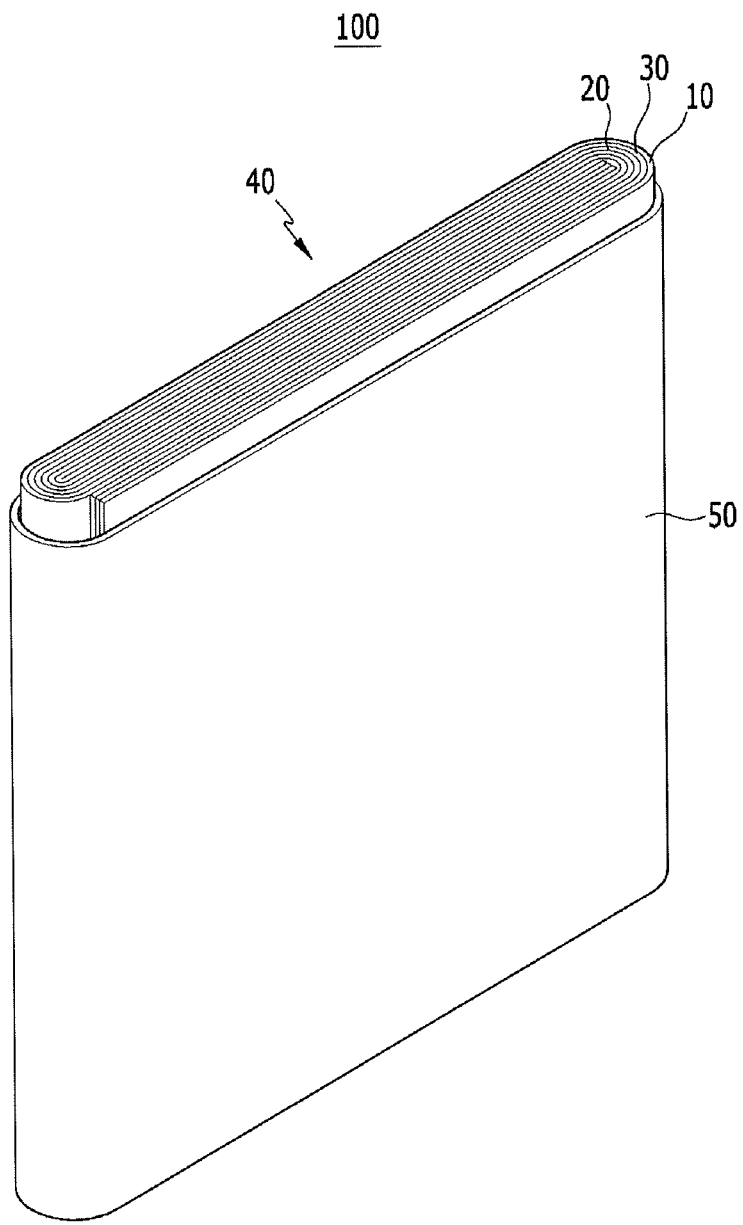

SEPARATOR FOR RECHARGEABLE LITHIUM BATTERY AND RECHARGEABLE LITHIUM BATTERY INCLUDING THE SAME

CROSS-REFERENCE TO RELATED APPLICATION

Korean Patent Application No. 10-2015-0043601, filed on Mar. 27, 2015, in the Korean Intellectual Property Office, and entitled: "Separator for Rechargeable Lithium Battery and Rechargeable Lithium Battery Including the Same," is incorporated by reference herein in its entirety.

BACKGROUND

1. Field

Embodiments relate to a separator for a rechargeable lithium battery and a rechargeable lithium battery including the same.

2. Description of the Related Art

Recently, research on a rechargeable lithium battery has been actively made, as necessity of a battery having high energy density as a power source for a portable electronic device is increased. In addition, since an electric vehicle and the like is researched with an increasing interest in the environment, research on the rechargeable lithium battery as a power source for the electric vehicle has been actively made.

A rechargeable lithium battery may include a positive electrode, a negative electrode, and a separator interposed between the positive and negative electrodes. The separator plays a role of electrically insulating the positive and negative electrodes, and may include micropores through which lithium ions move.

SUMMARY

Embodiments are directed to a separator for a rechargeable lithium battery and a rechargeable lithium battery including the same.

The embodiments may be realized by providing a separator for a rechargeable lithium battery, the separator including a substrate, and a heat-resistant porous layer on at least one side of the substrate, the heat-resistant porous layer including a crosslinked binder and a non-crosslinked binder, wherein the crosslinked binder has a cross-linked structure of at least one crosslinkable compound, the at least one crosslinkable compound including a multi-functional urethane-based compound, and the crosslinked binder and the non-crosslinked binder are included in a weight ratio of about 3:7 to about 8:2.

The crosslinked binder and the non-crosslinked binder may be included in a weight ratio of about 4:6 to about 6:4.

The at least one crosslinkable compound may include at least six curable functional groups.

The at least one crosslinkable compound may include 6 to 30 curable functional groups.

The multi-functional urethane-based compound may include a urethane group and at least two curable functional groups.

The multi-functional urethane-based compound may have a molecular weight or a weight average molecular weight of about 500 g/mol to about 80,000 g/mol.

The at least one crosslinkable compound may further include a multi-functional compound including at least three curable functional groups.

The curable functional group may include a (meth)acrylate group, a vinyl group, a hydroxy group, an ester group, a cyanate group, a carboxyl group, a thiol group, a C1 to C10 alkoxy group, a heterocyclic group, an amino group, or a combination thereof.

The at least one crosslinkable compound may include at least one multi-functional urethane-based compound having at least six curable functional groups, or a mixture of a multi-functional urethane-based compound having at least two curable functional groups and at least one multi-functional compound having as many curable functional group as will make a total of at least six curable functional groups among the multi-functional urethane-based compound together with the multi-functional compound.

The at least one crosslinkable compound may include at least one multi-functional urethane acrylate having at least six (meth)acrylate groups, or a mixture of a multi-functional urethane acrylate having at least two (meth)acrylate groups and at least one multi-functional compound having as many (meth)acrylate groups as will make a total of at least six (meth)acrylate groups among the multi-functional urethane-based compound together with the multi-functional compound.

The non-crosslinked binder may include a swellable polymer.

The non-crosslinked binder may include a vinylidenefluoride-based polymer, polymethylmethacrylate, polyacrylonitrile, polyvinylpyrrolidone, polyvinylacetate, polyethylenevinylacetate copolymer, polyethyleneoxide, cellulose acetate, cellulose acetate butyrate, cellulose acetate propionate, cyanoethylpullulan, cyanoethylpolyvinyl alcohol, cyanoethyl cellulose, cyanoethylsucrose, pullulan, carboxylmethyl cellulose, an acrylonitrile-styrene-butadiene copolymer, or a combination thereof The non-crosslinked binder may include a vinylidenefluoride-based polymer, the vinylidenefluoride-based polymer including a polyvinylidene fluoride (PVdF) homopolymer, a polyvinylidene fluoride-hexafluoropropylene (PVdF-HFP) copolymer, or a combination thereof.

The vinylidenefluoride-based polymer may have a weight average molecular weight of about 300,000 g/mol to about 1,500,000 g/mol.

The heat-resistant porous layer may further include a filler, the filler including an inorganic particle, an organic particle, or a combination thereof.

The inorganic particle may include $Al_2O_3$, $SiO_2$, $B_2O_3$, $Ga_2O_3$, $TiO_2$, $SnO_2$, or a combination thereof, and the organic particle may include an acryl-based compound, an imide-based compound, an amide-based compound, or a combination thereof.

The filler is included may be an amount of about 50 wt % to about 99 wt %, based on a total weight of the crosslinked binder, the non-crosslinked binder, and the filler.

The at least one crosslinkable compound may include at least one multi-functional urethane acrylate having at least six (meth)acrylate groups, or a mixture of a multi-functional urethane acrylate having at least two (meth)acrylate groups and at least one multi-functional compound having as many (meth)acrylate groups as will make a total of at least six (meth)acrylate groups among the multi-functional urethane-based compound together with the multi-functional compound, the non-crosslinked binder may include a vinylidenefluoride-based polymer, the vinylidenefluoride-based polymer including a polyvinylidene fluoride (PVdF) homopolymer, a polyvinylidene fluoride-hexafluoropropylene (PVdF-HFP) copolymer, or a combination thereof, and the filler may include the inorganic particle.

Each of a shrinkage ratio in a machine direction (MD) of the separator and a shrinkage ratio in a transverse direction (TD) of the separator may be less than or equal to about 5%, when calculated according to Equation 1:

$$\text{Shrinkage ratio (\%)} = [(L0-L1)/L0] \times 100 \quad \text{[Equation 1]}$$

wherein, in Equation 1, L0 indicates an initial length of the separator and L1 indicates a length of the separator after being allowed to stand at 200° C. for 10 minutes.

The embodiments may be realized by providing a rechargeable lithium battery comprising the separator according to an embodiment.

BRIEF DESCRIPTION OF THE DRAWING

Features will be apparent to those of skill in the art by describing in detail exemplary embodiments with reference to the attached drawing in which:

FIG. 1 illustrates an exploded perspective view of a rechargeable lithium battery according to one embodiment.

DETAILED DESCRIPTION

Example embodiments will now be described more fully hereinafter with reference to the accompanying drawing; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing FIGURE, the dimensions of layers and regions may be exaggerated for clarity of illustration. It will also be understood that when a layer or element is referred to as being "on" another layer or element, it can be directly on the other layer or element, or intervening elements may also be present. In addition, it will also be understood that when an element is referred to as being "between" two elements, it can be the only element between the two elements, or one or more intervening elements may also be present. Like reference numerals refer to like elements throughout.

As used herein, when a definition is not otherwise provided, the term "substituted" may refer to one substituted with a substituent selected from a halogen (F, Br, Cl, or I), a hydroxy group, an alkoxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, a phosphoric acid group or a salt thereof, a C1 to C20 alkyl group, a C2 to C20 alkenyl group, a C2 to C20 alkynyl group, a C6 to C30 aryl group, a C7 to C30 arylalkyl group, a C1 to C20 alkoxy group, a C1 to C20 heteroalkyl group, a C3 to C20 heteroarylalkyl group, C3 to C20 cycloalkyl group, C3 to C20 cycloalkenyl group, a C4 to C20 cycloalkynyl group, a C2 to C20 heterocycloalkyl group, and a combination thereof, instead of hydrogen of a compound.

As used herein, when a definition is not otherwise provided, the term 'hetero' may refer to one including 1 to 3 hetero atoms selected from N, O, S, and P.

Hereinafter, a separator for a rechargeable lithium battery according to one embodiment is described.

The separator for a rechargeable lithium battery according to the present embodiment may separate a negative electrode and a positive electrode and may provide a transporting passage for lithium ions. The separator may include a substrate and a heat-resistant porous layer on at least one side of the substrate.

The substrate may be porous due to pores. Lithium ions may be transferred through the pores. The substrate may be a, e.g., polyolefin, polyester, polytetrafluoroethylene, polyacetal, polyamide, polyimide, polycarbonate, polyetheretherketone, polyaryletherketone, polyetherimide, polyamideimide, polybenzimidazole, polyethersulfone, polyphenyleneoxide, a cyclic olefin copolymer, polyphenylenesulfide, polyethylenenaphthalene, a glass fiber, or a combination thereof. Examples of the polyolefin may include polyethylene, polypropylene, and the like, and examples of the polyester may include polyethyleneterephthalate, polybutyleneterephthalate, and the like. The substrate may be, e.g., a non-woven fabric or a woven fabric.

The substrate may have a single layer or multilayer structure. For example, the substrate may have a structure of a polyethylene single layer, a polypropylene single layer, a polyethylene/polypropylene double layer, a polypropylene/polyethylene/polypropylene triple layer, a polyethylene/polypropylene/polyethylene triple layer, or the like.

A thickness of the substrate may be about 1 μm to about 40 μm, e.g., about 1 μm to about 30 μm, about 1 μm to about 20 μm, about 5 μm to about 20 μm, or about 5 μm to about 10 μm. When the thickness of the substrate is within the range, a short-circuit between positive and negative electrodes may be reduced and/or prevented without increasing internal resistance of a battery.

The heat-resistant porous layer may be formed on one side or both sides of the substrate, and may include a crosslinked binder and a non-crosslinked binder.

The crosslinked binder may have a cross-linked structure in which a compound having a curable functional group is or has been cured. The compound having a curable functional group may be a monomer, an oligomer, a polymer, or a mixture thereof, each having a curable functional group.

As used herein, the term, 'a curable functional group' may refer to, e.g., a (meth)acrylate group, a vinyl group, a hydroxy group, an ester group, a cyanate group, a carboxyl group, a thiol group, a C1 to C10 alkoxy group, a heterocyclic group, an amino group, or a combination thereof, which can react by heat or light. Examples of the heterocyclic group may include an epoxy group, an oxetane group, and the like.

The crosslinked binder according to the present embodiment may have a cross-linked structure in which at least one crosslinkable compound is cured. In an implementation, the crosslinkable compound may be a multi-functional urethane-based compound having a curable functional group. The multi-functional urethane-based compound may be a multi-functional urethane-based monomer that has a curable functional group, a multi-functional urethane-based oligomer that has a curable functional group, or a multi-functional urethane-based polymer that has a curable functional group, or a mixture thereof.

In an implementation, the multi-functional urethane-based compound may be a compound having a urethane group and at least two curable functional groups. When the multi-functional urethane-based compound having a urethane group as the crosslinkable compound is used to form a crosslinked binder, a separator having improved wettability for an electrolyte solution may be secured. Thus, conductivity of lithium ions may increase and internal resistance may decrease to realize a rechargeable lithium battery having improved cell performance such cycle-life characteristics.

In an implementation, the multi-functional urethane-based compound may be obtained by a reaction of a compound having a functional group with an isocyanate compound. The functional group may be a curable functional group, e.g., a (meth)acrylate group, a vinyl group, a hydroxy group, an ester group, a cyanate group, a carboxyl group, a thiol group, a C1 to C10 alkoxy group, a heterocyclic group, an amino group, or a combination thereof, which can react by heat or light. In an implementation, the (meth)acrylate group may be used. The ester group may be represented by —COOR, the amino group may be represented by —NR$^a$R$^b$, wherein R, R$^a$, and R$^b$ are a C1 to C20 alkyl group, a C2 to C20 alkenyl group, a C2 to C20 alkynyl group, a C3 to C20 cycloalkyl group, a C3 to C20 cycloalkenyl group, a C4 to C20 cycloalkynyl group, or a C6 to C30 aryl group. The heterocyclic group may be a C2 to C20 heterocycloalkyl group, a C3 to C20 heterocycloalkenyl group, a C3 to C20 heterocycloalkynyl group, or a C6 to C20 heteroaryl group, e.g., an epoxy group, an oxetane group, and the like.

A molecular weight (e.g., if a small molecule or weight average molecular weight if a polymer) of the multi-functional urethane-based compound may be about 500 g/mol to about 80,000 g/mol, e.g., about 1,000 g/mol to about 50,000 g/mol. When the multi-functional urethane-based compound has a molecular weight within the range, a separator may secure excellent electrolyte solution wettabiliy, heat resistance, and mechanical strength. Thus, a rechargeable lithium battery having improved thermal stability may be realized and cycle-life characteristics and safety may be improved.

In an implementation, the crosslinked binder may be formed by mixing the crosslinkable compound with another crosslinkable compound, so that the crosslinkable compounds may have a total of at least six curable functional groups. In an implementation, the multi-functional urethane-based compound may be used alone or as a mixture of at least two kinds thereof as the at least one crosslinkable compound. For example, the at least one crosslinkable compound may include a multi-functional urethane-based compound having at least six curable functional groups alone, or a mixture of at least two kinds thereof, or may include a mixture of a multi-functional urethane-based compound having at least two curable functional groups with at least one other multi-functional compound that is not a urethane-based compound. Herein, the at least one multi-functional compound may have a total number of a curable functional groups of at least six by mixing with the multi-functional urethane-based compound having at least two curable functional groups. For example, the at least one crosslinkable compound may include at least one compound having as many curable functional groups as will make at least 6 functional groups in total, e.g., a multi-functional urethane-based compound. In an implementation, a cross-linked binder cured from the at least one crosslinkable compound having a total of at least six curable functional groups may help improve cross-linking. Thus, a separator having excellent heat resistance may be secured and a rechargeable lithium battery having excellent thermal stability even during battery explosion and overheating may be realized. For example, the at least one crosslinkable compound may include a total of, e.g., 6 to 30 curable functional groups.

The multi-functional compound mixable with the multi-functional urethane-based compound may include at least three curable functional groups, e.g., about 3 to 20 curable functional groups. Herein, the curable functional group may be the same as the functional group of the multi-functional urethane-based compound. In an implementation, the multi-functional compound may have at least one oxyethylene group in its main chain.

The at least one crosslinkable compound according to one embodiment may include, e.g., a multi-functional urethane-based compound having at least six curable functional groups alone, or a mixture of at least two thereof, or a mixture of a multi-functional urethane-based compound having at least two curable functional groups and at least one multi-functional compound having as many curable functional groups as will make a total of at least six curable functional groups of the crosslinkable compounds. Herein, as for the latter case, the number of the curable functional groups of the crosslinkable compounds, e.g., the total number of curable functional groups, may be the number of curable functional groups in a mixture of the multi-functional urethane-based compound and the multi-functional compound (e.g., a sum of curable functional groups on one (each type) of the multi-functional urethane-based compounds and on one (each type) of the multi-functional compounds).

For example, the at least one crosslinkable compound may include a multi-functional urethane acrylate having at least six (meth)acrylate groups alone or as a mixture of two or more (e.g., different kinds thereof). In an implementation, a mixture of multi-functional urethane acrylate having at least two (meth)acrylate groups with at least one kind of multi-functional acrylate having as many (meth)acrylate groups as will make a total of at least 6 (meth)acrylate groups in the crosslinkable compounds may be used. For example, multi-functional urethane acrylate having two (meth)acrylate groups may be mixed with at least one kind of multi-functional acrylate having at least 4 (meth)acrylate groups.

In this way, when the multi-functional urethane-based compound is used with or as a crosslinkable compound (such that at least six curable functional groups are present) to form a cross-linking system, a separator having a heat-resistant porous layer formed of this crosslinked binder on a substrate may have excellent heat resistance, mechanical strength, and electrolyte solution wettabiliy. Accordingly, a rechargeable lithium battery having excellent thermal stability, cycle-life characteristics, and safety may be realized.

The non-crosslinked binder is different from the cross-linked binder and may include a compound having no cross-linkable functional group, and may instead include a swelling polymer swollen by an electrolyte solution.

In an implementation, the non-crosslinked binder may include, e.g., a vinylidenefluoride-based polymer, polymethylmethacrylate, polyacrylonitrile, polyvinylpyrrolidone, polyvinylacetate, a polyethylene-vinylacetate copolymer, polyethyleneoxide, cellulose acetate, cellulose acetate butyrate, cellulose acetate propionate, cyanoethyl pullulan, cyanoethylpolyvinyl alcohol, cyanoethyl cellulose, cyanoethylsucrose, pullulan, carboxylmethyl cellulose, an acrylonitrile-styrene-butadiene copolymer, or a combination thereof.

The vinylidenefluoride-based polymer may be a homopolymer including only vinylidenefluoride monomer-derived unit, or a copolymer including a vinylidenefluoride-derived unit and other monomers-derived units. The copolymer may include, e.g., vinylidenefluoride-derived unit and at least one unit derived from chlorotrifluoroethylene (CTFE), trifluoroethylene (TFE), hexafluoropropylene (HFP), ethylene tetrafluoride, and an ethylene monomer. The copolymer may be a polyvinylidene fluoride-hexafluoropropylene (PVdF-HFP) copolymer including a vinylidenefluoride monomer-derived unit and a hexafluoropropylene (HFP) monomer-derived unit. When PVdF homopolymer, PVdF-HFP copolymer, or a combination thereof are used with the crosslinked binder, adherence to the substrate may increase and a uniform heat-resistant porous layer may be formed, and thus a safer separator may be ensured. In addition, the separator may have excellent impregnation properties in an electrolyte solution and may help improve cycle-life characteristics and high rate charge and discharge characteristics of a battery.

The vinylidenefluoride-based polymer may have a weight average molecular weight of about 300,000 g/mol to about 1,500,000 g/mol, e.g., about 400,000 g/mol to about 1,200,000 g/mol. When the weight average molecular weight of the vinylidenefluoride-based polymer is within the ranges, adherence of the substrate and the heat-resistant porous layer may be fortified and adherence to an electrode may be also improved. In addition, the vinylidenefluoride-based polymer may also be well dissolved in a small amount of a solvent during formation of a heat-resistant porous layer, and drying of the heat-resistant porous layer may be facilitated and a thermal shrinkage of a substrate and prevent short-circuit between positive and negative electrodes may be suppressed. In addition, excellent impregnation properties in an electrolyte solution may be obtained and thus cycle-life characteristics and high rate charge and discharge characteristics of a rechargeable lithium battery may be improved.

In an implementation, the polyvinylidene fluoride-hexafluoropropylene (PVdF-HFP) copolymer may include about 0.1 wt % to about 40 wt %, e.g., about 1 wt % to about 20 wt % of a repeating unit derived from hexafluoropropylene, based on a total amount of a repeating unit derived from vinylidenefluoride and a repeating unit derived from hexafluoropropylene.

In the heat-resistant porous layer, the crosslinked binder and the non-crosslinked binder may be included in a weight ratio of about 3:7 to about 8:2, e.g., about 3:7 to about 7:3, or about 4:6 to about 6:4. When the crosslinked binder and the non-crosslinked binder are included in the weight ratio ranges, adherence to a substrate may be fortified, and a separator may exhibit maximized improvement in heat resistance, mechanical strength, and electrolyte solution wettabiliy.

The heat-resistant porous layer may have a thickness of about 0.01 μm to about 20 μm, e.g., about 1 μm to about 10 μm, or about 1 μm to about 5 μm. When the thickness of the heat-resistant porous layer is within the ranges, short-circuit inside a battery may be suppressed and a safe separator may be ensured due to improved heat resistance, and an undesirable increase of internal resistance of a battery may be suppressed.

Hereinafter, a separator for a rechargeable lithium battery according to another embodiment is described.

A separator for a rechargeable lithium battery according to the present embodiment may include a substrate and a heat-resistant porous layer on at least one side of the substrate. The heat-resistant porous layer may include a binder and a filler. Herein, the binder may include the crosslinked binder and the non-crosslinked binder. The separator according to the present embodiment may include the filler (unlike the separator according to the aforementioned embodiment), the other constituent elements may be substantially the same, and the filler will be mainly illustrated herein.

When the filler is added to the heat-resistant porous layer, cell performance may be improved by further reducing and/or preventing thermal shrinkage of a substrate and thus suppressing short-circuit between positive and negative electrodes and, in addition, minimizing resistance of lithium ions. In addition, the filler may be used along with the crosslinked binder and the non-crosslinked binder and thus may help maximize a thermal shrinkage-preventing effect due to high cross-linking.

The filler may include, e.g., an inorganic particle, an organic particle, or a combination thereof. In an implementation, the filler may include, e.g., the inorganic particle.

The inorganic particle may include, e.g., $Al_2O_3$, $SiO_2$, $B_2O_3$, $Ga_2O_3$, $TiO_2$, $SnO_2$, or a combination thereof.

The organic particle may be, e.g., a particle including an acryl-based compound, an imide-based compound, an amide-based compound, or a combination thereof. In an implementation, the organic particle may have a core-sell structure.

The filler may have an average particle diameter of about 1 nm to about 2,000 nm, e.g., about 100 nm to about 1,000 nm, or about 100 nm to about 500 nm. The filler may include at least two kinds having different particle diameters. When the filler has an average particle diameter within the range, performance of a rechargeable lithium battery may be secured by uniformly forming a heat-resistant porous layer on a substrate and suppressing short-circuit between positive and negative electrodes and, in addition, minimizing resistance of lithium ions.

An amount of the filler may be about 50 wt % to about 99 wt %, e.g., about 60 wt % to about 95 wt %, based on a total weight of the heat-resistant porous layer, e.g., a total weight of the crosslinked binder, the non-crosslinked binder, and the filler. When the filler is included within the amount range, cell performance may be improved by preventing the shrinkage of a substrate and suppressing short-circuit between positive and negative electrodes.

In an implementation, a shrinkage ratio in each of a machine direction (MD) and a transverse direction (TD) of the separator may be less than or equal to about 5%, e.g., less than or equal to about 4%, or about 3% to about 4%, as calculated according to Equation 1, below. Herein, the transverse direction is perpendicular to the machine direction, and the shrinkage ratio is indicative of the length change of a separator after thermal shrinkage in each of the machine and transverse direction (e.g., a smaller shrinkage ratio is desirable). Accordingly, a stable rechargeable lithium battery during battery explosion and overheating may be realized.

$$\text{Shrinkage ratio (\%)} = [(L0 - L1)/L0] \times 100 \quad \text{[Equation 1]}$$

In Equation 1, L0 indicates an initial length of a separator and L1 indicates a length of a separator after being allowed to stand at 200° C. and for 10 minutes.

Hereinafter, a method of manufacturing a separator for a rechargeable lithium battery according to one embodiment is described.

A method of manufacturing a separator for a rechargeable lithium battery according to one embodiment may include coating a composition including a crosslinked binder, a non-crosslinked binder, and a solvent on at least one side of a substrate to form a heat-resistant porous layer. In an implementation, the method of manufacturing the separator for a rechargeable lithium battery may include coating a composition including at least one crosslinkable compound having a curable functional group for forming a crosslinked binder, a non-crosslinked binder, and a solvent on at least one side of a substrate, and curing the same to form a heat-resistant porous layer.

First, a composition for the heat-resistant porous layer including the crosslinked binder or the at least one crosslinkable compound, the non-crosslinked binder, an initiator and the solvent is coated on at least one side of the substrate.

For example, the composition for the heat-resistant porous layer may be prepared by mixing the crosslinked binder or at least one crosslinkable compound, the non-crosslinked binder, the initiator, and the solvent and stirring the same at about 10° C. to about 40° C. for about 30 minutes to about 5 hours. Herein, about 1 wt % to about 30 wt % of a mixture of the crosslinked binder or the at least one crosslinkable compound, and the non-crosslinked binder, and a balance amount of the solvent may be mixed, and the initiator may be added thereto in an amount of about 1 to about 10 parts by weight, e.g., about 1 to about 5 parts by weight, based on 100 parts by weight of the crosslinked binder or the at least one crosslinkable compound.

Specific examples of the crosslinked binder and the at least one crosslinkable compound having a curable functional group for forming the crosslinked binder may be the same as described above.

In an implementation, the crosslinked binder and the non-crosslinked binder may be present in a weight ratio of about 3:7 to about 8:2, e.g., about 3:7 to about 7:3, or about 4:6 to about 6:4 in the composition for the heat-resistant porous layer.

In an implementation, the at least one crosslinkable compound and the non-crosslinked binder may be present in a weight ratio of about 3:7 to about 8:2, e.g., about 3:7 to about 7:3, or about 4:6 to about 6:4 in the composition for the heat-resistant porous layer. Resultantly, the crosslinked binder and the non-crosslinked binder may be present in a weight ratio of about 3:7 to about 8:2, e.g., about 3:7 to about 7:3, or about 4:6 to about 6:4 in the heat-resistant porous layer.

The non-crosslinked binder may be the same as described above.

The solvent may include, e.g., alcohols such as methanol, ethanol, and isopropylalcohol; ketones such as acetone.

The initiator may include, e.g., a photoinitiator, a thermal initiator, or a combination thereof.

The photoinitiator may be used for photo-polymerization using ultraviolet rays. Examples of the photoinitiator may include acetophenones such as diethoxyacetophenone, 2-hydroxy-2-methyl-1-phenylpropan-1-one, benzyldimethylketal, 1-hydroxycyclohexyl-phenylketone, and 2-methyl-2-morphine(4-thiomethylphenyl)propan-1-one; benzoinethers such as benzoinmethylether, benzoinethylether, benzoinisopropylether, and benzoinisobutylether; benzophenones such as benzophenone, o-benzoyl methyl benzoate, 4-phenylbenzophenone, 4-benzoyl-4'-methyldiphenylsulfurous acid, 4-benzoyl-N,N-dimethyl-N-[2-(1-oxo-2-propenyloxy) ethyl] benzenemetanamium bromide, and (4-benzoylbenzyl) trimethylammoniumchloride; thioxanthones such as 2,4-diethylthioxanthone, and 1-chloro-4-dichlorothioxanthone; 2,4,6-trimethylbenzoyldiphenylbenzoyloxide, and the like. These may be used singularly or as a mixture of two or more.

The thermal initiator may be used for a thermal polymerization. The thermal initiator may include organic peroxide free radical initiator such as diacylperoxides, peroxyketals, ketone peroxides, hydroperoxides, dialkylperoxides, peroxyesters, peroxydicarbonates, and for example, lauroyl peroxide, benzoyl peroxide, cyclohexanone peroxide, 1,1-bis(t-butylperoxy)-3,3,5-trimethylcyclohexane, t-butylhydroperoxide may be used singularly or as a mixture of two or more.

The composition for the heat-resistant porous layer may further include a filler, and the filler may be the same as described above.

The stirring may be performed with, e.g., a ball mill, a beads mill, a screw mixer, and the like.

In an implementation, the composition for the heat-resistant porous layer may be coated in a method of dip coating, die coating, roll coating, comma coating, and the like.

After the composition for the heat-resistant porous layer, a drying process may be further performed. The drying process may be performed at about 80° C. to about 100° C. for about 5 seconds to about 60 seconds in a batch or continuous method.

Subsequently, when the at least one crosslinkable compound is added to the composition for a heat-resistant porous layer, the heat-resistant porous layer may be formed by curing the coated composition for a heat-resistant porous layer.

The curing may be performed through photocuring, thermal curing, or a combination thereof. The photocuring may be, e.g., performed by radiating UV of about 150 nm to about 170 nm for about 5 seconds to about 60 seconds. In an implementation, the thermal curing may be, e.g., performed at about 60° C. to about 120° C. for about 1 hour to about 36 hours, e.g., about 80° C. to about 100° C. for about 10 hours to about 24 hours.

In an implementation, the heat-resistant porous layer may be formed on a substrate in a method of lamination, coextrusion, and the like, other than the coating of the coating composition.

Hereinafter, a rechargeable lithium battery including the separator is illustrated referring to FIG. 1.

FIG. 1 illustrates an exploded perspective view showing a rechargeable lithium battery according to one embodiment. A prismatic rechargeable lithium battery according to one embodiment is illustrated as an example, but the separator may be applied to various batteries, e.g., a lithium polymer battery and a cylindrical battery.

Referring to FIG. 1, a rechargeable lithium battery 100 according to one embodiment may include an electrode assembly 40 in which a is interposed between a positive electrode 10 and a negative electrode 20, and a case 50 housing the electrode assembly 40. The positive electrode 10, the negative electrode 20, and the separator 30 may be impregnated in an electrolyte solution.

The separator 30 may be the same as described above.

The positive electrode 10 may include a positive current collector and a positive active material layer on the positive current collector. The positive active material layer may include a positive active material, a binder, and optionally a conductive material.

The positive current collector may use aluminum (Al), nickel (Ni), and the like.

The positive active material may use a compound capable of intercalating and deintercalating lithium. For example, at least one of a composite oxide or a composite phosphate of a metal selected from cobalt, manganese, nickel, aluminum, iron, or a combination thereof and lithium may be used. For example, the positive active material may use lithium cobalt oxide, lithium nickel oxide, lithium manganese oxide, lithium nickel cobalt manganese oxide, lithium nickel cobalt aluminum oxide, lithium iron phosphate, or a combination thereof.

The binder improves binding properties of positive active material particles with one another and with a current collector. Examples may include polyvinyl alcohol, carboxymethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like. These may be used singularly or as a mixture of two or more.

The conductive material improves conductivity of an electrode. Examples thereof may include natural graphite, artificial graphite, carbon black, a carbon fiber, a metal powder, a metal fiber, and the like. These may be used singularly or as a mixture of two or more. The metal powder and the metal fiber may use a metal of copper, nickel, aluminum, silver, and the like.

The negative electrode 20 may include a negative current collector and a negative active material layer on the negative current collector.

The negative current collector may use copper (Cu), gold (Au), nickel (Ni), a copper alloy, and the like.

The negative active material layer may include a negative active material, a binder and optionally a conductive material.

The negative active material may be a material that reversibly intercalates/deintercalates lithium ions, a lithium metal, a lithium metal alloy, a material being capable of doping and dedoping lithium, a transition metal oxide, or a combination thereof.

The material that reversibly intercalates/deintercalates lithium ions may be a carbon material, e.g., a suitable carbon-based negative active material, and examples thereof may include crystalline carbon, amorphous carbon, or a combination thereof. Examples of the crystalline carbon may be graphite such as amorphous, sheet-shape, flake, spherical shape or fiber-shaped natural graphite or artificial graphite. Examples of the amorphous carbon may be soft carbon (low temperature fired carbon) or hard carbon, a mesophase pitch carbonized product, fired coke, and the like. The lithium metal alloy may be an alloy of lithium and a metal selected from Na, K, Rb, Cs, Fr, Be, Mg, Ca, Sr, Si, Sb, Pb, In, Zn, Ba, Ra, Ge, Al, and Sn. The material being capable of doping and dedoping lithium may be Si, $SiO_x$ (0<x<2), a Si—C composite, a Si—Y alloy, Sn, $SnO_2$, a Sn—C composite, a Sn—Y, and the like, and at least one of these may be mixed with $SiO_2$. Specific examples of the element Y may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof. The transition metal oxide may be vanadium oxide, lithium vanadium oxide, and the like.

The binder and the conductive material used in the negative electrode may be the same as the binder and conductive material of the positive electrode.

The positive electrode and the negative electrode may be manufactured by mixing each active material composition including each active material and a binder, and optionally a conductive material in a solvent, and coating the active material composition or slurry on each current collector. For example, the solvent may be N-methylpyrrolidone, and the like.

The electrolyte solution may include an organic solvent and a lithium salt.

The organic solvent serves as a medium for transmitting ions taking part in the electrochemical reaction of a battery. Examples thereof may include a carbonate-based solvent, an ester-based solvent, an ether-based solvent, a ketone-based solvent, an alcohol-based solvent, and an aprotic solvent.

Examples of the carbonate-based solvent may include dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), and the like. Particularly, when the linear carbonate compounds and cyclic carbonate compounds are mixed, an organic solvent having a high dielectric constant and a low viscosity may be provided. The cyclic carbonate compound and the linear carbonate compound may be mixed together in a volume ratio ranging from about 1:1 to about 1:9.

Examples of the ester-based solvent may include methylacetate, ethylacetate, n-propylacetate, dimethylacetate, methylpropionate, ethylpropionate, γ-butyrolactone, decanolide, valerolactone, mevalonolactone, caprolactone, and the like. Examples of the ether-based solvent may be dibutylether, tetraglyme, diglyme, dimethoxyethane, 2-methyltetrahydrofuran, tetrahydrofuran, and the like. Examples of the ketone-based solvent may be cyclohexanone, and the like, and examples of the alcohol-based solvent may be ethanol, isopropyl alcohol, and the like.

The organic solvent may be used singularly or in a mixture of two or more, and when the organic solvent is used in a mixture of two or more, the mixture ratio may be controlled in accordance with a desirable cell performance.

The lithium salt may be dissolved in an organic solvent, supplies lithium ions in a battery, basically operates the rechargeable lithium battery, and improves lithium ion transportation between positive and negative electrodes therein.

Examples of the lithium salt may include $LiPF_6$, $LiBF_4$, $LiSbF_6$, $LiAsF_6$, $LiN(SO_3C_2F_5)_2$, $LiN(CF_3SO_2)_2$, $LiC_4F_9SO_3$, $LiClO_4$, $LiAlO_2$, $LiAlCl_4$, $LiN(C_xF_{2x+1}SO_2)(C_yF_{2y+1}SO_2)$, x and y are natural numbers, LiCl, LiI, $LiB(C_2O_4)_2$, or a combination thereof.

The lithium salt may be used in a concentration ranging from about 0.1 M to about 2.0 M. When the lithium salt is included within the above concentration range, an electrolyte may have excellent performance and lithium ion mobility due to optimal electrolyte conductivity and viscosity.

The rechargeable lithium battery including the separator may realize high capacity without degradation of cycle-life characteristics.

(Manufacture of Separator)

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Example 1

30 wt % of a multi-functional urethane acrylate having nine acrylate groups and a weight average molecular weight of 3,500 g/mol (MU9800, Miwon Specialty Chemical Co., Ltd.) and 70 wt % of acetone were mixed at ambient temperature for one hour, obtaining a crosslinkable binder solution. In addition, 7 wt % of a polyvinylidene fluoride-based binder having a weight average molecular weight of greater than or equal to 1,000,000 g/mol (KF 9300, KUREHA Inc.), 47 wt % of acetone, and 46 wt % of dimethyl acetamide (DMAC) were mixed with a stirrer at 40° C. for 4 hours, obtaining a non-crosslinkable binder solution. Furthermore, $Al_2O_3$ was ground through a bead mill, and 25 wt % of the ground $Al_2O_3$ was mixed with 75 wt % of acetone at 40° C. for 4 hours, obtaining an inorganic dispersion.

2.31 wt % of the crosslinkable binder solution, 6.59 wt % of the non-crosslinkable binder solution, 55.37 wt % of the inorganic dispersion, and 35.70 wt % of acetone were mixed, and 0.03 wt % of benzoyl peroxide as an initiator was added thereto, preparing a slurry.

The slurry was dip-coated to be respectively 2 μm thick, i.e., 4 μm thick in total, on both sides of a 7 μm-thick single polyethylene film as a substrate, dried, and cured at 85° C. for 24 hours, manufacturing a separator. Herein, the coating layer on the substrate included the crosslinked binder and the non-crosslinked binder in a weight ratio of 6:4.

Example 2

A separator was manufactured according to the same method as Example 1 except for preparing the crosslinkable binder solution by mixing 30 wt % of a multi-functional urethane acrylate having 15 acrylate groups and a weight average molecular weight of 20,000 g/mol (SC2152, Miwon Specialty Chemical Co., Ltd.) and 70 wt % of acetone at ambient temperature for 1 hour.

Example 3

A separator was manufactured according to the same method as Example 1 except for preparing the crosslinkable binder solution by mixing 30 wt % of a mixture of multi-functional urethane acrylate having two acrylate groups and a weight average molecular weight of 16,000 g/mol (PU2300C, Miwon Specialty Chemical Co., Ltd.), ethoxylated pentaerythritol tetraacrylate having four acrylate groups and a molecular weight of 558 g/mol (PE-044, Hannong Chemicals Inc.) in a weight ratio of 1:1, and 70 wt % of acetone at ambient temperature for one hour.

Example 4

A separator was manufactured according to the same method as Example 1 except for preparing the slurry by mixing 2.22 wt % of the crosslinkable binder solution, 14.28 wt % of the non-crosslinkable binder solution, 53.32 wt % of the inorganic dispersion liquid, and 30.15 wt % of acetone and adding 0.03 wt % of benzoyl peroxide as an initiator thereto. Herein, a coating layer formed of the slurry on a substrate included the crosslinked binder and the non-crosslinked binder in a weight ratio of 4:6.

Example 5

A separator was manufactured according to the same method as Example 2 except for preparing the slurry by mixing 2.22 wt % of the crosslinkable binder solution, 14.28 wt % of the non-crosslinkable binder solution, 53.32 wt % of the inorganic dispersion, and 30.15 wt % of acetone and adding 0.03 wt % of benzoyl peroxide as an initiator thereto. Herein, a coating layer formed of the slurry on a substrate included the crosslinked binder and the non-crosslinked binder in a weight ratio of 4:6.

Example 6

A separator was manufactured according to the same method as Example 3 except for preparing the slurry by mixing 2.22 wt % of the crosslinkable binder solution, 14.28 wt % of the non-crosslinkable binder solution, 53.32 wt % of the inorganic dispersion, and 30.15 wt % of acetone and adding 0.03 wt % of benzoyl peroxide as an initiator thereto. Herein, a coating layer formed of the slurry on a substrate included the crosslinked binder and the non-crosslinked binder in a weight ratio of 4:6.

Comparative Example 1

A separator was manufactured according to the same method as Example 1 except for preparing slurry by mixing 16.48 wt % of the non-crosslinkable binder solution, 55.39 wt % of the inorganic dispersion, and 28.13 wt % of acetone.

Comparative Example 2

A separator was manufactured according to the same method as Example 1 except for preparing the crosslinkable binder solution by mixing 30 wt % of pentaerythritol tetraacrylate having 4 acrylate groups and a molecular weight of 352 g/mol (PT, Aldrich Corporation) and 70 wt % of acetone at ambient temperature for 1 hour.

Comparative Example 3

A separator was manufactured according to the same method as Example 1 except for preparing the crosslinkable binder solution by mixing 30 wt % of polydimethylsiloxane (PDMS)-based multi-functional acrylate having 10 mol % to 20 mol % of an acrylate group and a molecular weight of less than 2,000 g/mol (UMS-182, Gelest Inc.) and 70 wt % of acetone at ambient temperature for 1 hour.

Comparative Example 4

A separator was manufactured according to the same method as Example 1 except for preparing the crosslinkable binder solution by mixing 30 wt % of ethylene oxide-dimethylsiloxane-ethylene oxide (ABA shape) block copolymer having two acrylate groups (at both ends) and an entire molecular weight of 1,500 g/mol to 1,600 g/mol (DBE-U12, Gelest Inc.) in which a polydimethylsiloxane (PDMS) block had a molecular weight of 700 g/mol to 800 g/mol and 70 wt % of acetone at ambient temperature for 1 hour.

Comparative Example 5

A separator was manufactured according to the same method as Example 1 except for preparing the slurry by mixing 0.77 wt % of the crosslinkable binder solution, 13.18 wt % of the non-crosslinkable binder solution, 55.38 wt % of the inorganic dispersion, and 30.66 wt % of acetone and adding 0.01 wt % of benzoyl peroxide as an initiator thereto. Herein, a coating layer formed of the slurry on a substrate included the crosslinked binder and the non-crosslinked binder in a weight ratio of 2:8.

Comparative Example 6

A separator was manufactured according to the same method as Example 2 except for preparing the slurry by mixing 0.77 wt % of the crosslinkable binder solution, 13.18 wt % of the non-crosslinkable binder solution, 55.38 wt % of the inorganic dispersion, and 30.66 wt % of acetone and adding 0.01 wt % of benzoyl peroxide as an initiator thereto. Herein, a coating layer formed of the slurry on a substrate included the crosslinked binder and the non-crosslinked binder in a weight ratio of 2:8.

Comparative Example 7

A separator was manufactured according to the same method as Example 3 except for preparing the slurry by mixing 0.77 wt % of the crosslinkable binder solution, 13.18 wt % of the non-crosslinkable binder solution, 55.38 wt % of the inorganic dispersion liquid, and 30.66 wt % of acetone and adding 0.01 wt % of benzoyl peroxide as an initiator thereto. Herein, a coating layer formed of the slurry on a substrate included the crosslinked binder and the non-crosslinked binder in a weight ratio of 2:8.

Comparative Example 8

A separator was manufactured according to the same method as Example 1 except for preparing the slurry by mixing 3.46 wt % of the crosslinkable binder solution, 1.65 wt % of the non-crosslinkable binder solution, 55.36 wt % of the inorganic dispersion, and 39.48 wt % of acetone and adding 0.05 wt % of benzoyl peroxide as an initiator thereto. Herein, a coating layer formed of the slurry on a substrate included the crosslinked binder and the non-crosslinked binder in a weight ratio of 9:1.

Comparative Example 9

A separator was manufactured according to the same method as Example 2 except for preparing the slurry by mixing 3.46 wt % of the crosslinkable binder solution, 1.65 wt % of the non-crosslinkable binder solution, 55.36 wt % of the inorganic dispersion, and 39.48 wt % of acetone and adding 0.05 wt % of benzoyl peroxide as an initiator thereto. Herein, a coating layer formed of the slurry on a substrate included the crosslinked binder and the non-crosslinked binder in a weight ratio of 9:1.

Comparative Example 10

A separator was manufactured according to the same method as Example 3 except for preparing the slurry by mixing 3.46 wt % of the crosslinkable binder solution, 1.65 wt % of the non-crosslinkable binder solution, 55.36 wt % of the inorganic dispersion, and 39.48 wt % of acetone and adding 0.05 wt % of benzoyl peroxide as an initiator thereto. Herein, a coating layer formed of the slurry on a substrate included the crosslinked binder and the non-crosslinked binder in a weight ratio of 9:1.

(Manufacture of Rechargeable Lithium Battery Cell)

$LiCoO_2$, polyvinylidene fluoride, and carbon black in a weight of 96:2:2 were added to an N-methylpyrrolidone (NMP) solvent, preparing a slurry. The slurry was coated on an aluminum (Al) thin film and dried, manufacturing a positive electrode.

Graphite, a styrene-butadiene rubber, and carboxyl methyl cellulose were added to water in a weight ratio of 97.5:1.5:1, preparing a slurry. The slurry was coated on a copper foil, dried, and compressed, manufacturing a negative electrode. An electrolyte solution was prepared by mixing ethylene carbonate (EC), ethylmethyl carbonate (EMC), and diethyl carbonate (DEC) in a volume ratio of 3:5:2 and preparing a 1.15 M $LiPF_6$ solution with the mixed solvent. The positive and negative electrodes, the electrolyte solution, and each separator according to Examples 1 to 6 and Comparative Examples 1 to 10 were used to manufacture a rechargeable lithium battery cell.

Evaluation 1: Heat Resistance of Separator

The heat resistance of each separator according to Examples 1 to 6 and Comparative Examples 1 to 10 was evaluated by measuring a thermal shrinkage ratio using the following method, and the results are provided in Table 1.

A sample was prepared by cutting each separator into a size of 10 cm×10 cm and allowed to stand at 200° C. (in a convection oven) for 10 minutes, and the shrinkage ratios of the sample in the MD (a machine direction) and TD (a transverse direction) were measured. The shrinkage ratio was calculated according to the following Equation 1.

$$\text{Shrinkage ratio (\%)} = [(L0 - L1)/L0] \times 100 \quad \text{[Equation 1]}$$

In Equation 1, L0 indicates an initial length of the separator and L1 indicates a length of the separator after being allowed to stand at 200° C. for 10 minutes.

TABLE 1

| | Cross-linking compound | Mixing weight ratio of crosslinked binder and non-crosslinked binder | Shrinkage ratio (%) MD | Shrinkage ratio (%) TD |
|---|---|---|---|---|
| Ex. 1 | MU9800 | 6:4 | 3 | 4 |
| Ex. 2 | SC2152 | 6:4 | 3 | 4 |
| Ex. 3 | PU2300C + PE-044 | 6:4 | 3 | 4 |
| Ex. 4 | MU9800 | 4:6 | 3 | 4 |
| Ex. 5 | SC2152 | 4:6 | 3 | 4 |
| Ex. 6 | PU2300C + PE-044 | 4:6 | 3 | 4 |
| Comp. Ex. 1 | — | 0:10 | 50 or more | 50 or more |
| Comp. Ex. 2 | PT | 6:4 | 5 | 5 |
| Comp. Ex. 3 | UMS-182 | 6:4 | * | * |
| Comp. Ex. 4 | DBE-U12 | 6:4 | * | * |
| Comp. Ex. 5 | MU9800 | 2:8 | 50 or more | 50 or more |
| Comp. Ex. 6 | SC2152 | 2:8 | 50 or more | 50 or more |
| Comp. Ex. 7 | PU2300C + PE-044 | 2:8 | 50 or more | 50 or more |
| Comp. Ex. 8 | MU9800 | 9:1 | * | * |
| Comp. Ex. 9 | SC2152 | 9:1 | * | * |
| Comp. Ex. 10 | PU2300C + PE-044 | 9:1 | * | * |

In Table 1, * indicates impossibility of securing a thermal shrinkage due to deterioration of coating properties. Specifically, Comparative Examples 3 and 4 showed the deterioration of coating properties in that stability of a composition was deteriorated due to dispersion deterioration, and Comparative Examples 8 to 10 showed coating deterioration in that coating application on a substrate and thus an initial binding force before curing was deteriorated.

Referring to Table 1, Examples 1 to 6 (using a mixture of a crosslinked binder formed from the crosslinkable compound and a non-crosslinked binder in a weight ratio of 3:7 to 8:2 as well as a multi-functional urethane-based compound alone as a crosslinkable compound or a mixture of a multi-functional urethane-based compound with another multi-functional urethane-based compound as a crosslinkable compound having at least six curable functional groups) showed a low thermal shrinkage ratio and thus excellent heat resistance, compared with Comparative Example 1 (using no crosslinked binder), Comparative Examples 2 to 4 (using no multi-functional urethane-based compound as the crosslinkable compound), and Comparative Examples 5 to 10 (using the crosslinked binder and the non-crosslinked binder out of the mixing weight ratio range). Accordingly, the separator realized a stable rechargeable lithium battery cell even in the event of battery explosion and/or overheating.

Evaluation 2: Contact Angle about Separator and Crosslinked Binder Film

Contact angle of water on the separators according to Examples 1 to 3 and Comparative Examples 1 to 4 was measured according to the following method, and the results are provided in Table 2.

Each separator was fixed on a glass plate and put parallel on a sample holder of a contact angle-measuring device, and its contact angle was read after dropping 2 μl of water on the surface of the sample with a syringe. The contact angle was measured three or more times and then averaged.

In addition, after forming a crosslinked binder (used during the manufacture of the separators according to Examples 1 to 3 and Comparative Examples 1 to 4) into a film, the contact angle of an electrolyte solution on the crosslinked binder film was measured, and the results are provided in Table 2. Herein, the electrolyte solution was prepared forming a 1 M $LiPF_6$ solution in a propylene carbonate (PC) solvent. In addition, the crosslinked binder film was formed by dissolving 30 wt % of the crosslinked binder in acetone, adding 5 parts by weight of benzyl peroxide as an initiator (based on 100 parts by weight of the crosslinked binder), pouring the mixture in an aluminum dish, and curing it at 85° C. for 24 hours.

TABLE 2

| | Crosslinkable compound | Mixing weight ratio of crosslinked binder and non-crosslinked binder | Contact angle of water on separator (°) | Contact angle of electrolyte solution on crosslinked binder film (°) |
|---|---|---|---|---|
| Ex. 1 | MU9800 | 6:4 | 105.8 | 20.2 |
| Ex. 2 | SC2152 | 6:4 | 115.8 | 18.8 |
| Ex. 3 | PU2300C + PE-044 | 6:4 | 121.3 | 40.7 |
| Comp. Ex. 1 | — | 6:4 | 120.4 | 31.9 |
| Comp. Ex. 2 | PT | 6:4 | 119.5 | * |
| Comp. Ex. 3 | UMS-182 | 6:4 | * | * |
| Comp. Ex. 4 | DBE-U12 | 6:4 | * | * |

In Table 2, * indicates that a contact angle was immeasurable, since a film could not be formed. Specifically, the crosslinked binder of Comparative Example 2 was not formed into a film due to deterioration of toughness, and the crosslinked binders of Comparative Examples 3 and 4 were not formed into a film due to deterioration of hardness.

Referring to the contact angles of the crosslinked binder films to evaluate characteristics of the crosslinked binders themselves in Table 2, Examples 1 to 3 showed that the multi-functional urethane acrylate used as a crosslinkable compound was hydrophilic and thus had affinity for an (aqueous) electrolyte solution.

Evaluation 3: Mechanical Strength of Separator

The puncture strength of the separators according to Examples 1 to 6 and Comparative Examples 1 to 10 was measured according to the following method, and the results are provided in Table 3.

The puncture strength was measured by cutting the separators into a size of 5 cm×5 cm to obtain a sample, fixing the sample in an equipment holder, and using a puncture strength tester (K5, Kato Tech) equipped with a Φ1 pin.

TABLE 3

| | Crosslinkable compound | Mixing weight ratio of crosslinked binder and non-crosslinked binder | Puncture strength (gf) |
|---|---|---|---|
| Ex. 1 | MU9800 | 6:4 | 401.07 |
| Ex. 2 | SC2152 | 6:4 | 388.56 |
| Ex. 3 | PU2300C + PE-044 | 6:4 | 386.75 |
| Ex. 4 | MU9800 | 4:6 | 403.04 |
| Ex. 5 | SC2152 | 4:6 | 385.12 |
| Ex. 6 | PU2300C + PE-044 | 4:6 | 402.54 |
| Comp. Ex. 1 | — | — | 400.75 |
| Comp. Ex. 2 | PT | 6:4 | 374.21 |
| Comp. Ex. 3 | UMS-182 | 6:4 | * |
| Comp. Ex. 4 | DBE-U12 | 6:4 | * |
| Comp. Ex. 5 | MU9800 | 2:8 | 376.78 |
| Comp. Ex. 6 | SC2152 | 2:8 | 372.36 |
| Comp. Ex. 7 | PU2300C + PE-044 | 2:8 | 378.15 |
| Comp. Ex. 8 | MU9800 | 9:1 | * |
| Comp. Ex. 9 | SC2152 | 9:1 | * |
| Comp. Ex. 10 | PU2300C + PE-044 | 9:1 | * |

In Table 3, * indicates that a composition was unstable and insufficiently coated, and thus the puncture strength could not be measured.

Referring to Table 3, the separators according to Examples 1 to 6 (using a mixture of a crosslinked binder formed from a crosslinkable compound and a non-crosslinked binder in a weight ratio of 3:7 to 8:2 as well as a multi-functional urethane-based compound alone or a mixture of a multi-functional urethane-based compound as a crosslinkable compound having at least six curable functional groups with another kind of multi-functional compound as the crosslinkable compound) showed high mechanical strength, compared with the separators according to Comparative Examples 1 to 10. Accordingly, this separator secured a rechargeable lithium battery cell having excellent safety.

Evaluation 4: Thermal Safety of Rechargeable Lithium Battery Cell

Thermal safety of the rechargeable lithium battery cells according to Examples 1 to 6 and Comparative Examples 1 to 10 was evaluated according to the following method, and the results are provided in Table 4.

The cells were aged for 24 hours, and after a formation process at 0.2 C (1 C=2,400 mAh), the cells were fully charged in order of charge, discharge, and charge at 0.2 C. The fully charged cells were put in a hot box tester, heated at 3° C./min, and maintained at each temperature of 145° C., 150° C., and 155° C. for 30 minutes to check whether the cells were ignited. Herein, non-ignition was marked as P, while ignition was marked as F.

TABLE 4

| | Ignition | | |
|---|---|---|---|
| | 145° C. | 150° C. | 155° C. |
| Ex. 1 | P | P | P |
| Ex. 2 | P | P | P |
| Ex. 3 | P | P | P |
| Ex. 4 | P | P | P |
| Ex. 5 | P | P | P |

Examples 1 to 10 were evaluated according to the following method, and the results are provided in Table 5.

The cells were aged for 24 hours, and after a formation process at 0.2 C (1 C=2400 mAh) and a cut-off within a range of 4.35 V to 3.0 V, the cells were charged at 0.5 C and discharged at 0.5 C as one cycle. Then, the cells were charged at 1 C and discharged at 1 C after the cut-off within a range of 4.35 V to 3.0 V during the rest of 499 repeated cycles.

In Table 5, capacity retention (%) of the cells was obtained as a percentage of discharge capacity at each cycle relative to discharge capacity at the first cycle.

TABLE 5

| | Capacity retention (%) | | | | | | | | | |
|---|---|---|---|---|---|---|---|---|---|---|
| | 50cy | 100cy | 150cy | 200cy | 250cy | 300cy | 350cy | 400cy | 450cy | 500cy |
| Ex. 1 | 98.0 | 95.9 | 94.5 | 93.1 | 91.7 | 90.3 | 89.7 | 89.0 | 87.8 | 86.9 |
| Ex. 2 | 97.7 | 95.4 | 93.6 | 92.2 | 91.0 | 90.1 | 89.0 | 880. | 87.2 | 86.0 |
| Ex. 3 | 97.5 | 95.6 | 93.8 | 92.3 | 91.1 | 89.8 | 88.6 | 87.9 | 86.8 | 85.9 |
| Ex. 4 | 97.8 | 95.6 | 94.1 | 92.8 | 91.6 | 90.1 | 89.4 | 88.9 | 87.6 | 86.8 |
| Ex. 5 | 97.8 | 95.7 | 94.4 | 92.9 | 91.2 | 89.9 | 89.3 | 88.3 | 87.4 | 86.5 |
| Ex. 6 | 97.9 | 95.6 | 94.2 | 92.5 | 91.5 | 89.9 | 89.9 | 88.1 | 87.2 | 86.7 |
| Comp. Ex. 1 | 96.4 | 94.8 | 92.8 | 90.2 | 88.6 | 86.7 | 85.9 | 85.0 | 84.8 | 82.6 |
| Comp. Ex. 2 | 96.9 | 95.0 | 92.8 | 90.5 | 89.9 | 87.2 | 86.9 | 85.1 | 84.2 | 82.4 |
| Comp. Ex. 3 | * | * | * | * | * | * | * | * | * | * |
| Comp. Ex. 4 | * | * | * | * | * | * | * | * | * | * |
| Comp. Ex. 5 | 96.8 | 94.9 | 93.1 | 90.9 | 89.1 | 87.4 | 86.1 | 85.7 | 84.9 | 82.7 |
| Comp. Ex. 6 | 82.7 | 95.2 | 93.0 | 90.7 | 88.9 | 87.2 | 85.9 | 85.1 | 84.8 | 82.9 |
| Comp. Ex. 7 | 97.1 | 95.2 | 92.9 | 90.4 | 89.1 | 86.9 | 85.9 | 85.3 | 85.1 | 82.7 |
| Comp. Ex. 8 | * | * | * | * | * | * | * | * | * | * |
| Comp. Ex. 9 | * | * | * | * | * | * | * | * | * | * |
| Comp. Ex. 10 | * | * | * | * | * | * | * | * | * | * |

TABLE 4-continued

| | Ignition | | |
|---|---|---|---|
| | 145° C. | 150° C. | 155° C. |
| Ex. 6 | P | P | P |
| Comp. Ex. 1 | F | F | F |
| Comp. Ex. 2 | F | F | F |
| Comp. Ex. 3 | * | * | * |
| Comp. Ex. 4 | * | * | * |
| Comp. Ex. 5 | F | F | F |
| Comp. Ex. 6 | F | F | F |
| Comp. Ex. 7 | F | F | F |
| Comp. Ex. 8 | * | * | * |
| Comp. Ex. 9 | * | * | * |
| Comp. Ex. 10 | * | * | * |

In Table 4, * indicates that a battery cell could not be manufactured due to coating defect of a separator.

Referring to Table 4, the rechargeable lithium battery cells according to Examples 1 to 6 (using a mixture of a crosslinked binder formed from a crosslinkable compound and a non-crosslinked binder in a weight ratio of 3:7 to 8:2 as well as a multi-functional urethane-based compound alone or a mixture of a multi-functional urethane-based compound as a crosslinkable compound having at least six curable functional groups with another kind of multi-functional compound as the crosslinkable compound) showed excellent thermal safety, compared with the rechargeable lithium battery cells according to Comparative Examples 1 to 10.

Evaluation 5: Cycle-Life Characteristics of Rechargeable Lithium Battery Cells

Cycle-life characteristics of the rechargeable lithium battery cells according to Examples 1 to 6 and Comparative In Table 5, * indicates that a battery cell could not be manufactured due to coating defect of a separator.

Referring to Table 5, the rechargeable lithium battery cells according to Examples 1 to 6 (using a mixture of a crosslinked binder formed from a crosslinkable compound and a non-crosslinked binder in a weight ratio of 3:7 to 8:2 as well as a multi-functional urethane-based compound alone or a mixture of a multi-functional urethane-based compound as a crosslinkable compound having at least six curable functional groups with another kind of multi-functional compound as the crosslinkable compound) showed excellent cycle-life characteristics, compared with the rechargeable lithium battery cells according to Comparative Examples 1 to 10.

By way of summation and review, a separator may help maintain excellent battery stability in the face of exothermicity, as a battery tends to be lighter and down-sized and keeps requiring of high capacity as a power source having high power/large capacity for the electric vehicle.

For such a battery, a separator formed by coating a binder resin and a ceramic particle on a porous substrate may be used. However, this separator may experience issues with stability due to, e.g., shrinkage during overheating of the battery.

The embodiments may provide a separator for a rechargeable lithium battery that has improved mechanical strength and wettability for an electrolyte solution as well as excellent heat resistance.

The embodiments may provide a rechargeable lithium battery having improved cell performance such as cycle-life characteristics and safety as well as thermal stability due to the separator.

The rechargeable lithium battery according to an embodiment may realize cell performance such as cycle-life characteristics and safety as well as thermal stability due to the separator for a rechargeable lithium battery having improved mechanical strength and wettability for an electrolyte solution.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

DESCRIPTION OF SYMBOLS

100: rechargeable lithium battery
10: positive electrode
20: negative electrode
30: separator
40: electrode assembly
50: case

What is claimed is:

1. A separator for a rechargeable lithium battery, the separator comprising:
   a substrate, and
   a heat-resistant porous layer on at least one side of the substrate, the heat-resistant porous layer including a crosslinked binder and a non-crosslinked binder,
   wherein:
   the crosslinked binder has a cross-linked structure of at least one crosslinkable compound, the at least one crosslinkable compound including a multi-functional urethane-based compound,
   the crosslinked binder and the non-crosslinked binder are included in different amounts, and in a weight ratio of about 3:7 to 4:6 or 6:4 to about 8:2, and
   the at least on crosslinkable compound includes:
   at least one multi-functional urethane-based compound having at least six curable functional groups, or
   a mixture of multi-functional urethane-based compound having at least two curable functional groups and at least one multi-functional compound having as many curable functional group as will make a total of at least six curable functional groups among the multi-functional urethane-based compound together with the multi-functional compound.

2. The separator for a rechargeable lithium battery as claimed in claim 1, wherein the crosslinked binder and the non-crosslinked binder are included in a weight ratio of 4:6 or 6:4.

3. The separator for a rechargeable lithium battery as claimed in claim 1, wherein the at least one crosslinkable compound includes at least six curable functional groups.

4. The separator for a rechargeable lithium battery as claimed in claim 1, wherein the at least one crosslinkable compound includes 6 to 30 curable functional groups.

5. The separator for a rechargeable lithium battery as claimed in claim 1, wherein the multi-functional urethane-based compound includes a urethane group and at least two curable functional groups.

6. The separator for a rechargeable lithium battery as claimed in claim 1, wherein the multi-functional urethane-based compound has a molecular weight or a weight average molecular weight of about 500 g/mol to about 80,000 g/mol.

7. The separator for a rechargeable lithium battery as claimed in claim 1, wherein the at least one crosslinkable compound further includes a multi-functional compound including at least three curable functional groups.

8. The separator for a rechargeable lithium battery as claimed in claim 3, wherein the curable functional group includes a (meth)acrylate group, a vinyl group, a hydroxy group, an ester group, a cyanate group, a carboxyl group, a thiol group, a C1 to C10 alkoxy group, a heterocyclic group, an amino group, or a combination thereof.

9. The separator for a rechargeable lithium battery as claimed in claim 1, wherein the at least one crosslinkable compound includes:
   at least one multi-functional urethane acrylate having at least six (meth)acrylate groups, or
   a mixture of a multi-functional urethane acrylate having at least two (meth)acrylate groups and at least one multi-functional compound having as many (meth)acrylate groups as will make a total of at least six (meth)acrylate groups among the multi-functional urethane-based compound together with the multi-functional compound.

10. The separator for a rechargeable lithium battery as claimed in claim 1, wherein the non-crosslinked binder includes a swellable polymer.

11. The separator for a rechargeable lithium battery as claimed in claim 1, wherein the non-crosslinked binder includes a vinylidenefluoride-based polymer, polymethylmethacrylate, polyacrylonitrile, polyvinylpyrrolidone, polyvinylacetate, polyethylene-vinylacetate copolymer, polyethyleneoxide, cellulose acetate, cellulose acetate butyrate, cellulose acetate propionate, cyanoethylpullulan, cyanoethylpolyvinyl alcohol, cyanoethyl cellulose, cyanoethylsucrose, pullulan, carboxylmethyl cellulose, an acrylonitrile-styrene-butadiene copolymer, or a combination thereof.

12. The separator for a rechargeable lithium battery as claimed in claim 1, wherein the non-crosslinked binder includes a vinylidenefluoride-based polymer, the vinylidenefluoride-based polymer including a polyvinylidene fluoride (PVdF) homopolymer, a polyvinylidene fluoride-hexafluoropropylene (PVdF-HFP) copolymer, or a combination thereof.

13. The separator for a rechargeable lithium battery as claimed in claim 12, wherein the vinylidenefluoride-based polymer has a weight average molecular weight of about 300,000 g/mol to about 1,500,000 g/mol.

14. The separator for a rechargeable lithium battery as claimed in claim 1, wherein the heat-resistant porous layer further includes a filler, the filler including an inorganic particle, an organic particle, or a combination thereof.

15. The separator for a rechargeable lithium battery as claimed in claim 14, wherein:
   the inorganic particle includes $Al_2O_3$, $SiO_2$, $B_2O_3$, $Ga_2O_3$, $TiO_2$, $SnO_2$, or a combination thereof, and
   the organic particle includes an acryl-based compound, an imide-based compound, an amide-based compound, or a combination thereof.

16. The separator for a rechargeable lithium battery as claimed in claim 14, wherein the filler is included in an amount of about 50 wt % to about 99 wt %, based on a total weight of the crosslinked binder, the non-crosslinked binder, and the filler.

17. The separator for a rechargeable lithium battery as claimed in claim 14, wherein:
    the at least one crosslinkable compound includes:
        at least one multi-functional urethane acrylate having at least six (meth)acrylate groups, or
        a mixture of a multi-functional urethane acrylate having at least two (meth)acrylate groups and at least one multi-functional compound having as many (meth)acrylate groups as will make a total of at least six (meth)acrylate groups among the multi-functional urethane-based compound together with the multi-functional compound,
    the non-crosslinked binder includes a vinylidenefluoride-based polymer, the vinylidenefluoride-based polymer including a polyvinylidene fluoride (PVdF) homopolymer, a polyvinylidene fluoride-hexafluoropropylene (PVdF-HFP) copolymer, or a combination thereof, and
    the filler includes the inorganic particle.

18. The separator for a rechargeable lithium battery as claimed in claim 1, wherein each of a shrinkage ratio in a machine direction (MD) of the separator and a shrinkage ratio in a transverse direction (TD) of the separator is less than or equal to about 5%, when calculated according to Equation 1:

$$\text{Shrinkage ratio } (\%) = [(L0-L1)/L0] \times 100 \quad \text{[Equation 1]}$$

wherein, in Equation 1, L0 indicates an initial length of the separator and L1 indicates a length of the separator after being allowed to stand at 200° C. for 10 minutes.

19. A rechargeable lithium battery comprising the separator as claimed in claim 1.

20. The separator for a rechargeable lithium battery as claimed in claim 1, wherein the multi-functional urethane-based compound includes:
    a multi-functional urethane acrylate having nine acrylate groups and a weight average molecular weight of 3,500 g/mol,
    a multi-functional urethane acrylate having fifteen acrylate groups and a weight average molecular weight of 20,000 g/mol, or
    a multi-functional urethane acrylate having two acrylate groups and a weight average molecular weight of 16,000 g/mol.

* * * * *